Figure 1:
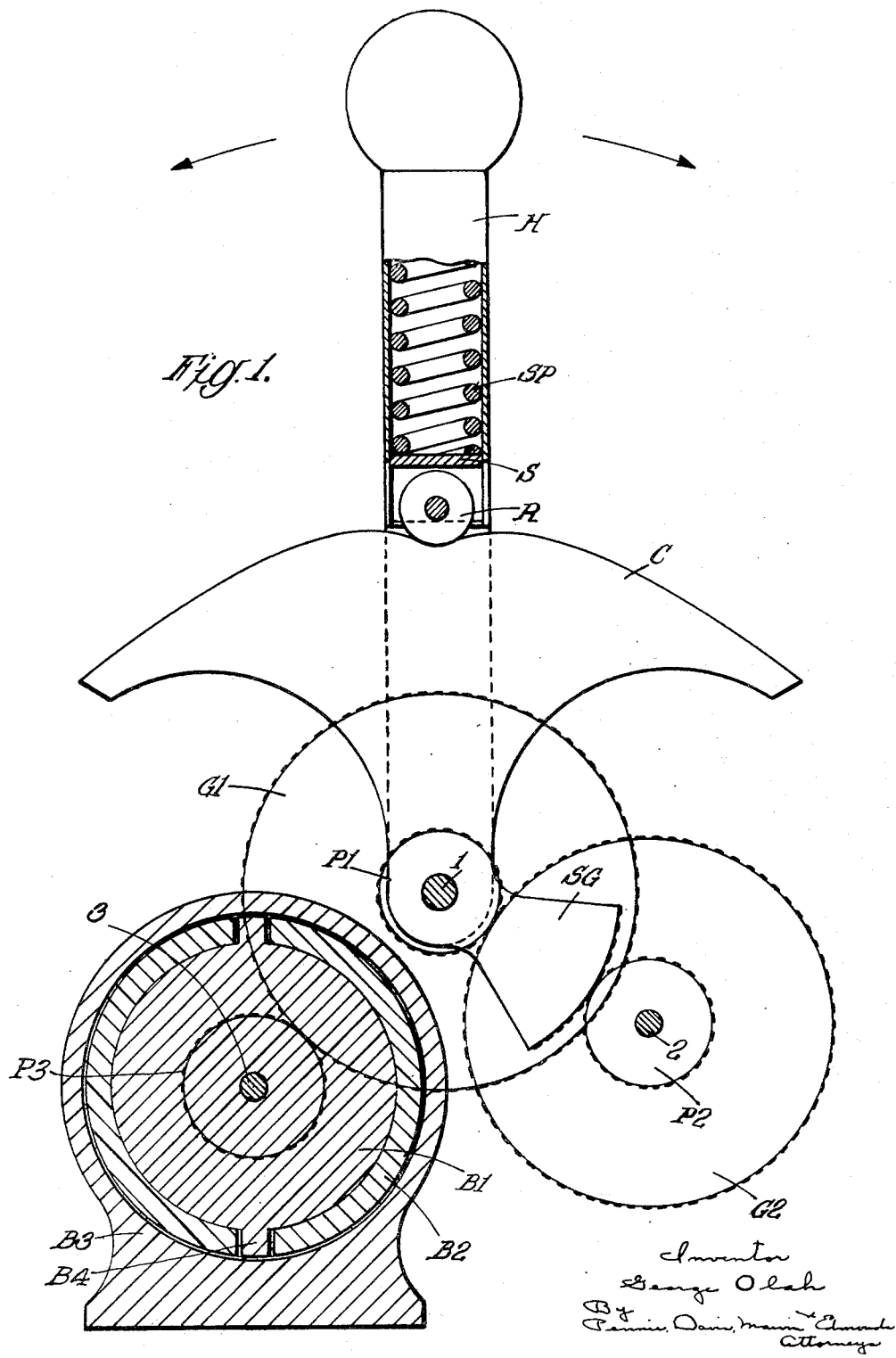

June 4, 1946.                G. OLAH                2,401,501
                    SYNCHRONOUS REMOTE CONTROL
                       Filed July 14, 1943           2 Sheets-Sheet 2

Patented June 4, 1946

2,401,501

UNITED STATES PATENT OFFICE 2,401,501

SYNCHRONOUS REMOTE CONTROL

George Olah, London, England, assignor to Precision Developments Company Limited, London, England, a corporation of Great Britain Application July 14, 1943, Serial No. 494,737
In Great Britain April 29, 1942

7 Claims. (Cl. 74—565)

This invention relates to remote control apparatus in which a receiver unit is operated synchronously and in step with a hand-controlled or instrument-controlled transmitter unit by electric currents, impulses or mechanical, pneumatic or hydraulic means from the transmitter unit.

In such controls which may be of any of the known types it is often found that either the remote transmission itself is limited in its speed and may be damaged or fall out of step if the permissible speed is exceeded or the receiver element may be unable to respond to the speed or acceleration of the transmitter which will again cause either damage or falling out of step between transmitter and receiver.

In other cases the power capacity of the receiver element which is dependent on a certain combination of speed and acceleration may be limited.

Finally in some cases the controlled device at the receiver end may require limitation in speed and acceleration to avoid excessive stresses, instability or other dangers ensuing from violent controlling action.

In most cases it will be found that the limitations imposed can be formulated under three headings:

(a) Acceleration may be limited to an absolute value irrespective of speed.

(b) Speed may be limited to an absolute value irrespective of acceleration.

(c) A certain combination of speed and acceleration each with definite factors of proportionality may be limited irrespective of the absolute value of each of the two magnitudes.

On the other hand with widely varying speeds and acceleration at the transmitter end it is frequently specified that immediate response of the receiver is not called for except at low speeds and accelerations. It is permissible in such cases to allow the receiver to lag behind the control of the transmitter until it has time to fall in step when the transmitter has slowed down its movement.

Such requirements are most characteristic of hand-operated controls and the controlling element will therefore be referred to in the following description as a hand lever although the invention may also be applied to instrument-controlled transmissions.

The purpose of the present invention is to provide a transmitter mechanism which limits the speed and acceleration of the remote transmission of signals irrespective of the speed and acceleration of the hand lever and to ensure subsequent synchronisation by maintaining a movement of the transmitting member until synchronisation with the hand lever is achieved.

The present invention consists of a remote control apparatus in which a hand-operated or instrument-operated controlling member drives a signal-transmitting member through mechanical transmission gearing and is characterised by the fact that the mechanical transmission gearing between the controlling member and the signal transmitting member is divided by one or more yielding members responsive to the driving resistance, preferably according to an adjustable characteristic, into at least two sections and that to at least one of the said sections of the said mechanical transmission gearing is or are coupled one or more members generating a driving resistance dependent, in a preferably adjustable manner, on the speed and/or acceleration of their movement.

A mechanism composed of a number of sections with movement resisting elements can be made to fulfill the most varying requirements.

In order that the invention may be better understood and applied, reference will now be made to Fig. 1 of the accompanying drawings in which a simple mechanism is shown embodying the essential features of the present invention.

Figure 2:
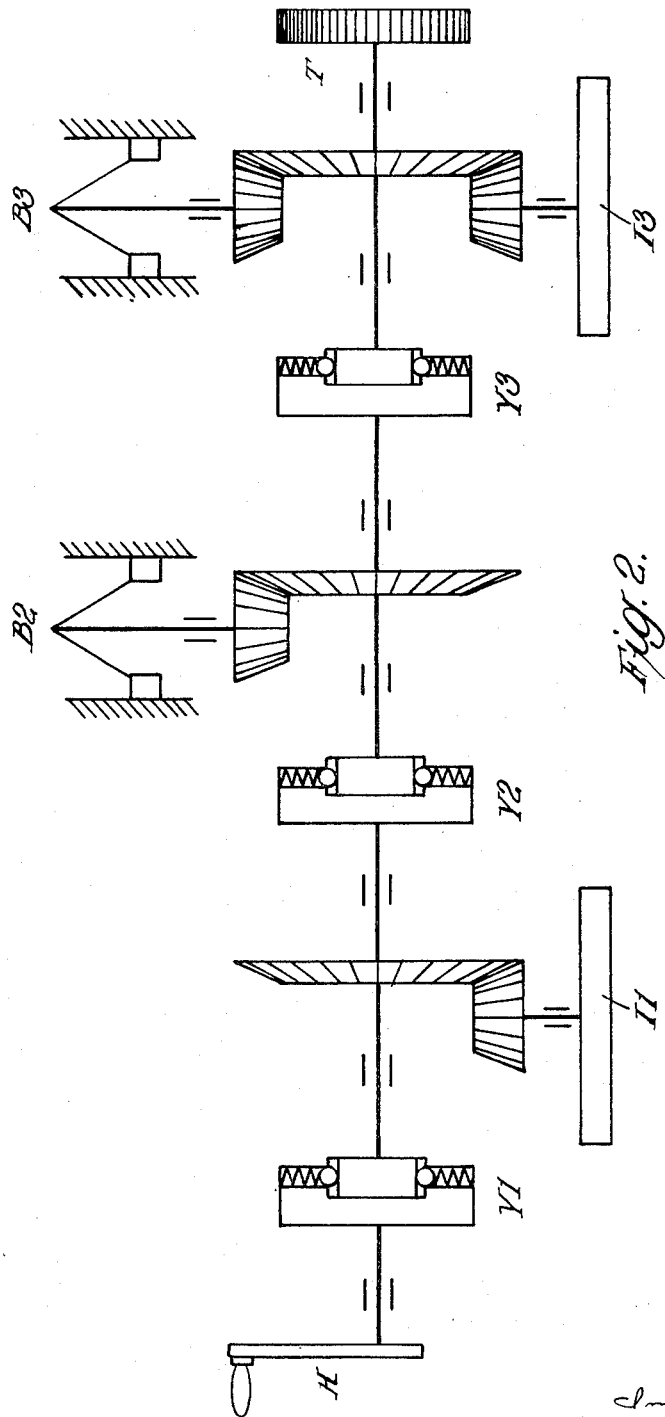

Fig. 2 illustrates diagrammatically a more complicated mechanism.

Referring first to Fig. 1 the operating or controlling member consists of a hand lever H. The signal transmitting member which may be any type of rotary position transmitter such as a potentiometer resistance ring, or a device known under the trade name of "Selsyn" transmitter or the like is assumed to be coupled to shaft 3 but is not shown in the drawings.

Within the handle of the hand lever H is a slidable member S loaded by a helical compression spring SP and carrying a roller R which is pressed against a symmetrical cam C of a special shape which includes a centralising V-groove. The hand lever H and the cam C are pivoted on the shaft I.

Integral with the cam C is a toothed segment SG meshing with a pinion P2 on a shaft 2 on which is mounted a gear G2. This gear G2 in turn meshes with a pinion P1 on shaft 1, and on shaft 1 is mounted a gear G1, meshing with a pinion P3 on a shaft 3. On shaft 3 is mounted a drum B1 adapted to drive two ring segments B2 by means of lugs B4 on the drum B1. The mechanism is enclosed in and adapted to rotate in housing B3. The shaft 3 or the drum B1 forms the means for operating the transmitting member. The assemblies P1 and G1, and P2 and G2 are unitary.

In operation when the transmitter or the hand lever H is moved roller R being firmly seated in the centralising groove positively transmits motion through the cam C to the segment SG and through the gearing P2, G2, P1, P3, G1 to the drum B1. This drum which is considerably geared up presents through its moment of inertia a resistance to the drive which is proportional to the acceleration of the movement of the signal transmitter shaft 3. The ring segments B2 are pressed by centrifugal force against the inside of the housing B3 and the force of friction will generate a resistance torque to rotation which will be roughly proportional to the square of the speed.

If at any time during the movement of the hand lever H the total resistance due to the inertia of the drum B1 and to the centrifugal braking effect of the ring segments B2 should exert a force on the roller R in excess of the tension of the spring SP, the roller R will be displaced from the centralising V groove in the cam and the cam will lag behind the hand lever H.

The contour of the cam may be so arranged that the driving torque on the cam remains substantially constant. This is achieved through a reaction of the spiral slope as the roller is raised against the spring when the angular deviation between hand lever H and cam C increases.

The relatively simple mechanism as described can meet the requirements enumerated above under (c), viz. the limitation of a certain combination of speed and acceleration. If the elements are designed appropriately, it can be made to correspond to the power limitation of the receiver of the remote transmission.

The described mechanism can be considerably improved at the expense of some complication by providing adjustment to the initial tension of the spring SP for example by means of an adjustable back stop, adjustments to the inertia mass B1 for example by means of additional masses and adjustments to the centrifugal brake for example by pivoting the ring segments B2 to the drum B1 in different positions.

A number of alternative mechanisms can be substituted for the centrifugal friction brake. These include escapement mechanisms, eddy current brakes, centrifugal friction brakes, air propeller brakes, dash pot mechanisms and the like.

A suitable mechanism can be chosen according to the characteristics. Escapements, eddy current brakes and various damping mechanisms generate a resistance roughly proportional to speed. Centrifugal friction and propeller brakes generate a torque roughly proportional to the square of the speed.

By suitable combinations of the various mechanisms a large number of characteristics can be imposed.

The yielding mechanism also allows for numerous alternatives to the choice illustrated and many types of characteristics can be obtained.

To meet other possible requirements of a transmitter of this kind such as an additional independent limitation of speed and/or acceleration more complicated mechanism is called for.

Fig. 2 illustrates diagrammatically a mechanism of this kind.

Referring to Fig. 2 Y1, Y2, Y3 indicate symbolic yielding members coupled in series between the controlling member H and the transmitting member T. To the section between Y1 and Y2 is coupled a resistance to movement responsive to acceleration and symbolized by a geared up inertia mass I'. To the next section of the mechanical transmission, between Y2 and Y3 is coupled a speed responsive driving resistance symbolized by the centrifugal brake B2. Finally in common with the transmitting element are driven a second inertia mass I³ and a second centrifugal brake B3.

If the individual driving resistances as well as the yielding members are provided with adjustment means it is evident that the requirements (a), (b) and (c) enumerated above can be met under the most varying circumstances. In particular, due to the arrangement in series, speed and acceleration will be limited independently of each other and of the power capacity of the receiver.

I claim:

1. Mechanism for limiting the acceleration of a transmitting member and the speed at which it is operated comprising a transmitting member to be operated, a cam mounted for pivotal movement, gearing for actuating said transmitting member, said gearing being operatively connected to the cam member and driven by pivotal movement thereof, an operating member, means connecting the operating member to the cam member, said connecting means being yieldable upon a predetermined driving resistance, and means included in said mechanism operative upon the transmitting member being accelerated or operated at a predetermined speed to generate a driving resistance sufficient to cause said connecting means to yield, whereby the maximum effective speed at which the operating member can be operated to actuate the transmitting member is controlled.

2. Mechanism for limiting the acceleration of a transmitting member and the speed at which it is operated as set forth in claim 1 in which the yieldable connecting means between the cam member and the operating member comprises a spring-loaded member carried by one of said members and engageable in a groove in the other of said members.

3. Mechanism for limiting the acceleration of a transmitting member and the speed at which it is operated as set forth in claim 1 in which the yieldable connecting means between the cam member and the operating member comprises a spring-loaded roller carried by the operating member engaging in a generally V-shaped groove in the cam member.

4. Mechanism for limiting the acceleration of a transmitting member and the speed at which it is operated as set forth in claim 1 in which the operating member and the cam are pivoted on the same axis, the yielding connecting means between the cam member and the operating member comprises a spring-loaded member carried by the operating member and engageable in a groove in the cam member, the operating member is movable out of said groove to positions at either side thereof and the surface of the cam at each side of the groove is symmetrical.

5. Mechanism for limiting the acceleration of a transmitting member and the speed at which it is operated as set forth in claim 1 in which the means for generating the driving resistance is proportional to the speed of its movement.

6. Mechanism for limiting the acceleration of a transmitting member and the speed at which it is operated as set forth in claim 1 in which the means for generating the driving resistance is responsive to acceleration and includes an inertia mass.

7. A synchronous remote control apparatus comprising a transmitting member to be operated, a pivoted cam member, a pivoted operating member, gearing for actuating said transmitting member, said gearing being operatively connected to one of said pivoted members and driven by pivotal movement thereof, means connecting the operating member to the cam member, said connecting means being yieldable upon a predetermined driving resistance, and means included in said mechanism operative upon the transmitting member being accelerated or operated at a predetermined speed to generate a driving resistance sufficient to cause said connecting means to yield, whereby the maximum effective speed at which the operating member can be operated to actuate the transmitting member is controlled.

GEORGE OLAH.